(12) United States Patent
Erdogan et al.

(10) Patent No.: US 11,741,752 B2
(45) Date of Patent: Aug. 29, 2023

(54) IRIS RECOGNITION APPARATUS

(71) Applicant: IRIS ID, INC., Seoul (KR)

(72) Inventors: Ferhat Erdogan, Summit, NJ (US); Joosuk Kim, Seoul (KR); Sehhwan Jung, West Windsor, NJ (US); Jun S. Hong, Holmdel, NJ (US)

(73) Assignee: IRIS ID, INC., Seoul (KR)

( * ) Notice: Subject to any disclaimer, the term of this patent is extended or adjusted under 35 U.S.C. 154(b) by 241 days.

(21) Appl. No.: 17/372,303

(22) Filed: Jul. 9, 2021

(65) Prior Publication Data

US 2022/0164575 A1 May 26, 2022

(30) Foreign Application Priority Data

Nov. 23, 2020 (KR) .......................... 10-2020-0157582

(51) Int. Cl.
*G06V 40/18* (2022.01)
*G06V 40/19* (2022.01)
*G06V 30/19* (2022.01)
*H04N 23/51* (2023.01)
*H04N 23/56* (2023.01)

(52) U.S. Cl.
CPC ........ *G06V 40/18* (2022.01); *G06V 30/19193* (2022.01); *G06V 40/19* (2022.01); *G06V 40/197* (2022.01); *H04N 23/51* (2023.01); *H04N 23/56* (2023.01)

(58) Field of Classification Search
CPC .. G06V 40/18; G06V 30/19193; G06V 40/19; G06V 40/197; H04N 5/2252; H04N 5/2256
See application file for complete search history.

(56) References Cited

U.S. PATENT DOCUMENTS

2017/0195467 A1* 7/2017 Chang ................. H04M 1/0264
2019/0020830 A1* 1/2019 Zhou ....................... G06F 21/32
(Continued)

FOREIGN PATENT DOCUMENTS

KR 1020010105567 A 11/2001
KR 10-2003-0077128 A 10/2003
(Continued)

OTHER PUBLICATIONS

KR 1020200157582, Office Action (dated Jan. 14, 2022), 4 Pages.

*Primary Examiner* — Oschta I Montoya
(74) *Attorney, Agent, or Firm* — LOZA & LOZA LLP; Heidi Eisenhut (57) ABSTRACT

An iris recognition apparatus includes a front cover in which a module mounting hole is formed, a cover plate configured to be coupled to a front surface of the front cover, and an iris recognition module configured to be fitted into the module mounting hole from the rear of the front cover. The iris recognition module includes a shield cover fitted into the module mounting hole, a red-eye phenomenon generator including at least one illumination part, a substrate on which the at least one illumination part is mounted and disposed on the rear of the shield cover, an imaging module including a camera module for iris recognition, a substrate on which the camera module is mounted and disposed on the rear of the red-eye phenomenon generator, and a light passage hole formed in the shield cover corresponding to the front of the at least one illumination part.

9 Claims, 7 Drawing Sheets

(56) References Cited

U.S. PATENT DOCUMENTS

2020/0046235 A1\* 2/2020 Jung .................... A61B 5/6898
2020/0366774 A1\* 11/2020 Jia .......................... H04N 23/00
2021/0141878 A1\* 5/2021 Zhou ....................... G06F 21/32

FOREIGN PATENT DOCUMENTS

KR     10-2006-0035620 A     4/2006
KR     1020170119310 A     10/2017

\* cited by examiner

IRIS RECOGNITION APPARATUS

CROSS-REFERENCE TO RELATED APPLICATIONS

The present application claims the benefits of priority to Korean Patent Application No. 10-2020-0157582, filed on Nov. 23, 2020, which is herein incorporated by reference in its entireties.

THE BACKGROUND

1. The Field

The present disclosure relates to an iris recognition apparatus.

2. Description of the Related Art

In general, as a means for security, crime prevention, and identity authentication, means such as a key and an access card have been widely used. However, such a conventional authentication means has a high possibility of theft, loss, duplication, or the like, and thus there is a disadvantage of being very vulnerable to security. In addition, there are disadvantages that you must carry the conventional authentication means and memorize the password. In order to improve this, a lot of research is being done on personal identification technologies with higher security and convenience.

A biometric system has been commercialized as a personal identification technology with high security and convenience. Biometrics refers to extracting unique biometric information (fingerprint, face, iris, cornea, hand shape, veins on the back of the hand, voice, or the like) that each person has and making it possible to identify the unique biometric information. For biometric recognition, a corresponding living body is imaged using a camera, and information for recognition is extracted by analyzing the imaging result.

Among the biometric methods that are currently researched and commercialized, the iris recognition system has a lower self-rejection rate, higher recognition rate, and higher accuracy than the fingerprint recognition method and is widely used as authentication means in places requiring high security such as financial institutions and airports.

However, authentication means through iris recognition are also exposed to a situation in which iris information of others is forged for an illegal purpose such as a crime. For example, there is a phenomenon in which a printed product printed with an iris image of another person or a fake eyeball in which an iris image of another person is printed on the surface thereof is manufactured and passed through an authentication process.

Various studies have been made to eradicate such so-called iris forgery, and in Prior Art 1 and 2, an apparatus and method for determining whether an iris image is forged or not using a red-eye effect are disclosed.

The red-eye phenomenon refers to a phenomenon in which, when light is irradiated while the pupil of a person is open, light is reflected from the capillaries inside the pupil, and the pupil of the user looks red.

This red-eye phenomenon requires blood to flow through the capillaries inside the pupil, which is a phenomenon that only appears in living people.

Therefore, when a person with the purpose of a crime is positioned in front of the authentication camera using the forged eyeball, the red-eye phenomenon does not occur even when light is irradiated to the forged eyeball so that it is possible to clearly determine whether the iris information is forged.

Meanwhile, in order to effectively generate the red-eye phenomenon, as disclosed in Prior Art 2, the illumination should be installed close to the camera sensor so that the optical axis of the camera sensor and the light irradiation axis of the illumination form an angle within 5 degrees.

Meanwhile, a cover member made of transparent glass or plastic is installed on the front surface of the iris recognition apparatus provided with the optical module for iris recognition to prevent foreign matters from entering the optical module.

Here, when the light irradiated from the illumination collides with the cover member, is reflected, and enters an adjacent camera sensor, severe noise is caused in the eye image of the subject imaged by the camera sensor. In other words, the image of the eyeball is blurred by light reflection, making it impossible to clearly recognize the red-eye phenomenon.

Prior Art 1: Korea Laid-Open Patent Publication No. 2006-0035620 (Feb. 9, 2006)

Prior Art 2: Korea Laid-Open Patent Publication No. 2003-0077128 (Oct. 1, 2003)

THE SUMMARY

The present disclosure is proposed to improve the above problems.

In order to achieve the above object, an iris recognition apparatus according to an embodiment of the present disclosure includes a front cover in which a module mounting hole is formed, a cover plate configured to be coupled to a front surface of the front cover, and an iris recognition module configured to be fitted into the module mounting hole from the rear of the front cover, in which the iris recognition module includes a shield cover fitted into the module mounting hole, a red-eye phenomenon generator including at least one illumination part and a substrate on which the at least one illumination part is mounted, and disposed on the rear of the shield cover, and an imaging module including a camera module for iris recognition, and a substrate on which the camera module is mounted, and disposed on the rear of the red-eye phenomenon generator, and a light passage hole is formed in the shield cover corresponding to the front of the at least one illumination part.

According to the iris recognition apparatus according to an embodiment of the present disclosure having the above configuration, it is possible to minimize the phenomenon in which the light irradiated from the illumination part is reflected after the light collides with the cover plate and then enters the camera, and as a result, there is an advantage that the red-eye effect is clearly imaged by the camera.

THE DETAILED DESCRIPTION

Hereinafter, an iris recognition apparatus according to an embodiment of the present disclosure will be described in detail with reference to the drawings.

Figure 1:
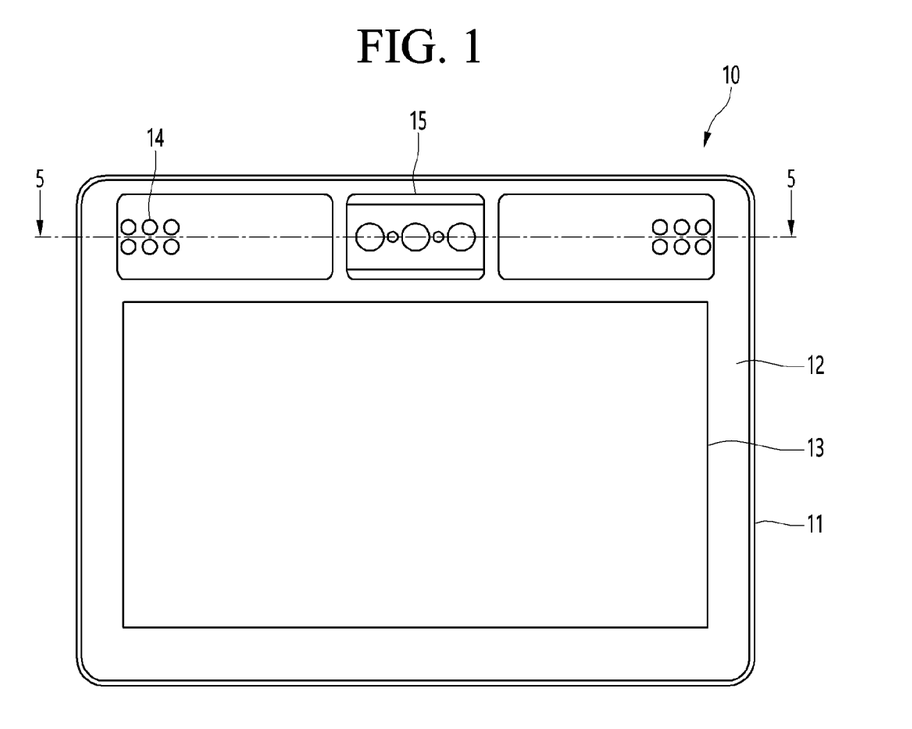
FIG. 1 is a front view illustrating an iris recognition apparatus according to an embodiment of the present disclosure.
Figure 2:
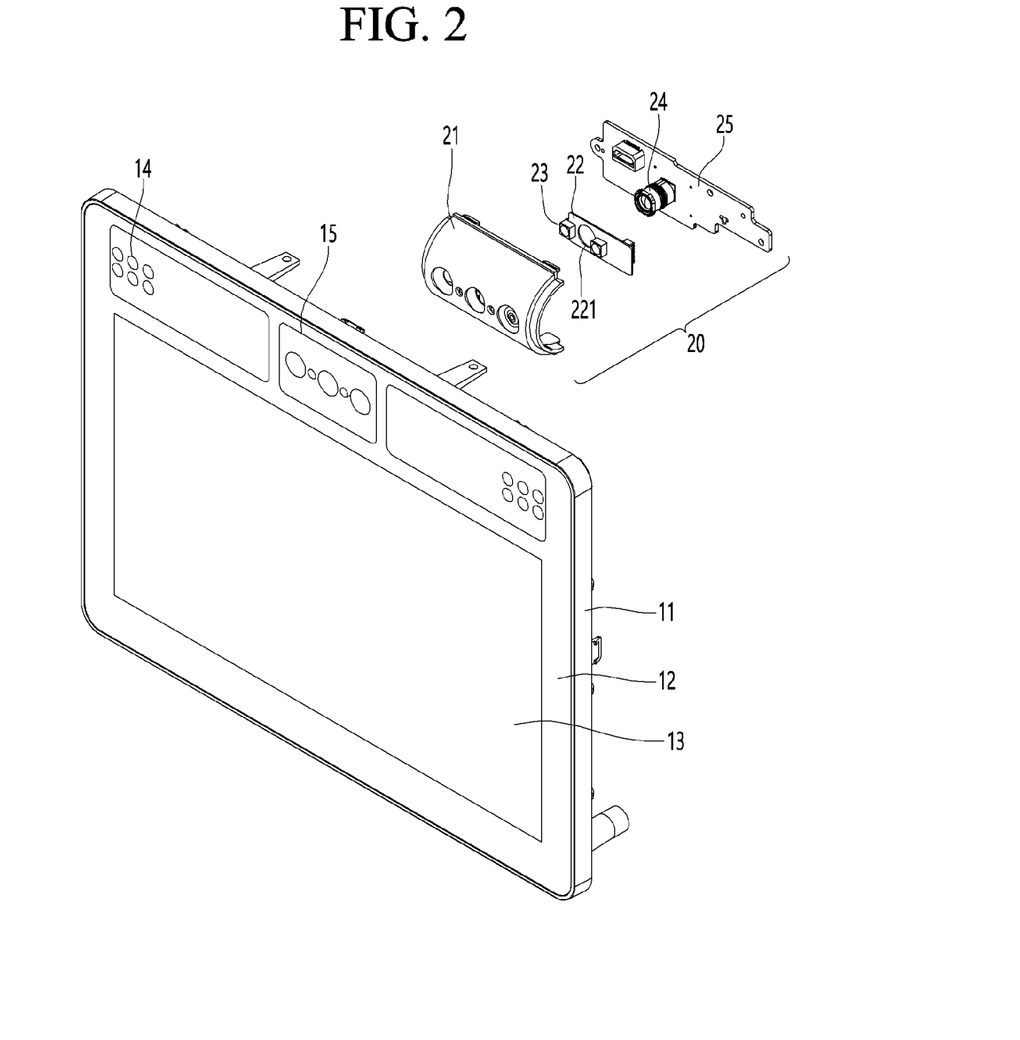
FIG. 2 is an exploded perspective view illustrating the configuration of an iris recognition apparatus including main parts.

FIG. 1 is a front view illustrating an iris recognition apparatus according to an embodiment of the present disclosure, and FIG. 2 is an exploded perspective view illustrating the configuration of an iris recognition apparatus including main parts.

Referring to FIGS. 1 and 2, the iris recognition apparatus 10 according to an embodiment of the present disclosure has an external shape formed by a front cover 11 and a case coupled to the rear surface of the front cover 11. In addition, electric parts and mechanical parts are mounted in the inner space formed by the front cover 11 and the case.

In detail, the iris recognition apparatus 10 may further include a cover plate 12 mounted on the front surface of the front cover 11. The cover plate 12 may be made of a transparent material including glass or plastic.

Alternatively, a display window 13, an infrared irradiation part 14, and an iris recognition window 15 may be partitioned on the cover plate 12. Here, an opaque film is attached to the front or rear surface of the cover plate 12, and only parts of the display window 13, the infrared irradiation part 14, and the iris recognition window 15 may be processed transparently.

As another method, a smart film is attached to the front or rear surface of the cover plate 12, so that when light is irradiated from the rear of the cover plate 12, the front or rear surface of the cover plate 12 can be changed to be transparent.

For example, when the display window 13 is normally maintained in an opaque state, and a display panel (not illustrated) disposed at the rear of the display window 13 is turned on, it may also be possible to make the display window 13 having a size corresponding to the screen size of the display panel 13 transparent.

An opening corresponding to the display window 13 is formed in the front cover 11, and the display panel may be mounted in the opening.

An illumination device that irradiates infrared rays to recognize an iris image of a user may be disposed behind the infrared irradiation part 14. The infrared irradiation part 14 may be disposed on the left and right sides of the display window 13.

The infrared irradiation part 14 also maintains an opaque state, and when infrared radiation is emitted from the illumination device, the infrared radiation can be recognized by the user's eyes.

A module mounting hole corresponding to the size of the iris recognition window 15 is formed in the part of the front cover 11 corresponding to the rear of the iris recognition window 15, and the iris recognition module 20 can be mounted in the opening.

The iris recognition window 15 may be kept transparent so that the front surface of the iris recognition module 20 is exposed to the user.

Meanwhile, the iris recognition module 20 may include a shield cover 21 mounted to the module mounting hole, an illumination part 23 disposed behind the shield cover 21, a substrate 22 on which the illumination part 23 is mounted, a camera 24 for imaging a user's iris, and a substrate 25 on which the camera 24 and the image sensor 241 (refer to FIG. 5) are mounted. The illumination part 23 may include an LED element.

Here, the combination of the illumination part 23 and the substrate 22 may be defined as a red-eye phenomenon generating module.

In addition, the camera 24 and the image sensor 241 may be defined as an iris recognition camera module, and the combination of the iris recognition camera module and the substrate 25 may be defined as an imaging module.

A separate camera module 26 for imaging a user's face may be mounted on the substrate 25 at a side of the iris recognition camera module.

A pair of illumination parts 23 may be mounted on the substrate 22, and a camera hole 221 may be formed in the substrate 22 between the pair of illumination parts 23. In addition, the camera 24 may be positioned immediately behind the camera hole 221.

The red-eye phenomenon generating module and the imaging module may be coupled to the shield cover 21 at the rear of the shield cover 21 as one body. In addition, the iris recognition module 20 may be tilted up and down while being inserted into the module mounting hole formed in the front cover 11. This is so that the optical axis of the camera 24 and the light irradiation axis of the illumination part 23 reach the pupil of the user standing in front of the iris recognition apparatus 10.

Figure 3:
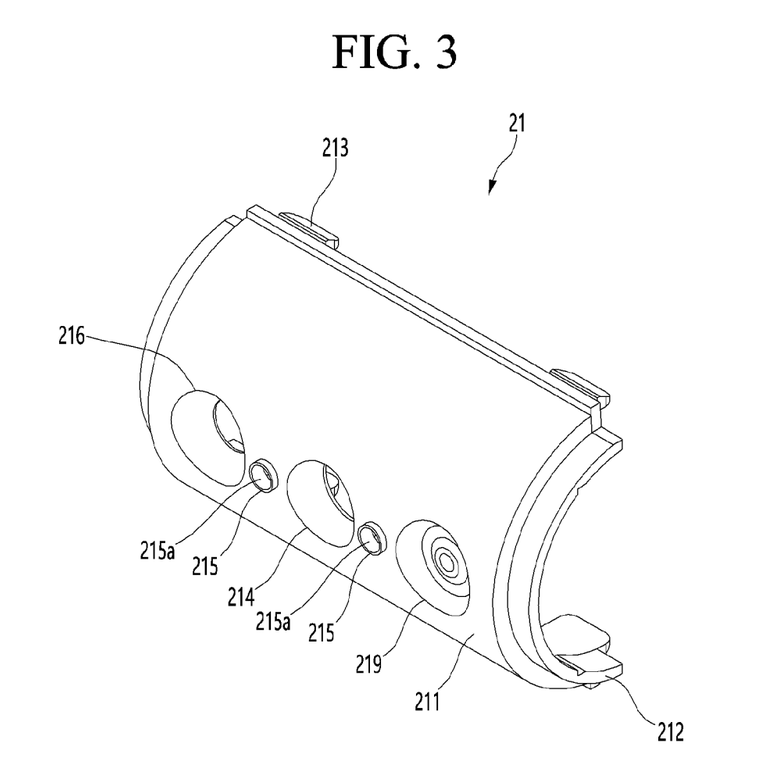
FIG. 3 is a front perspective view illustrating a shield cover constituting an iris recognition module according to an embodiment of the present disclosure.
Figure 4:
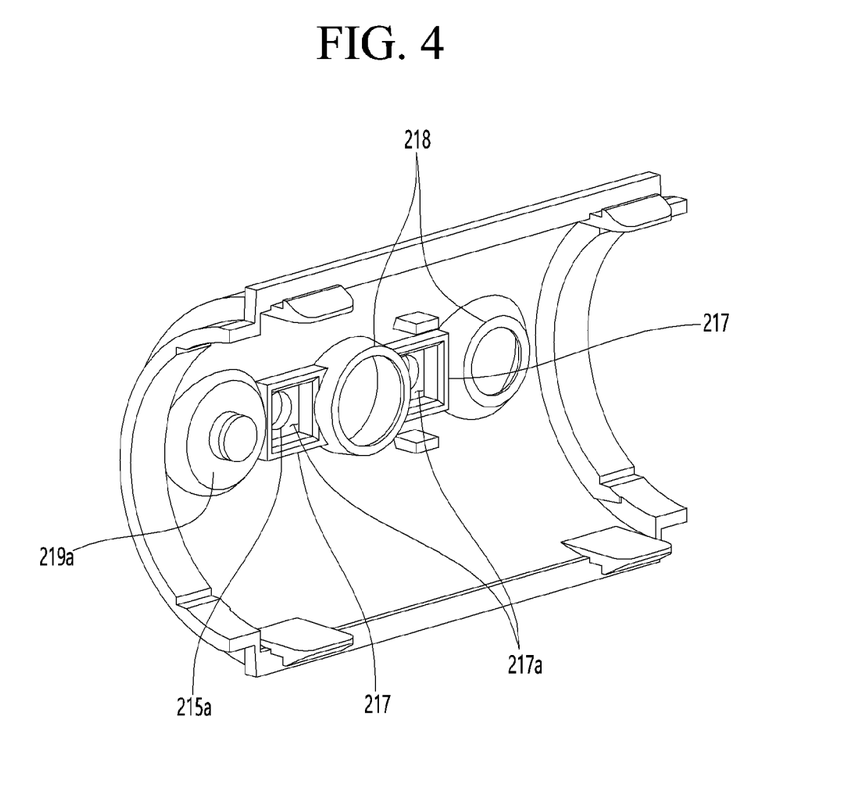
FIG. 4 is a rear perspective view illustrating the shield cover.

FIG. 3 is a front perspective view illustrating a shield cover constituting an iris recognition module according to an embodiment of the present disclosure, and FIG. 4 is a rear perspective view illustrating the shield cover.

Referring to FIGS. 3 and 4, the shield cover 21 may include a cover body 211 curved to a predetermined curvature, an engagement jaw 210 protruding from the top and bottom ends of the cover body 211, respectively, a guide rib 212 extending stepwise from the left and right ends of the cover body 211, and one or a plurality of fastening hooks 213 extending from each of the top and bottom ends of the cover body 211.

In detail, the cover body 211 is inserted into the module mounting hole formed in the front cover 11, and the guide rib 212 is in close contact with the rear surface of the front cover 11. Specifically, a support rib supporting the guide rib 212 extends from the rear surface of the front cover 11, and an end part of the support rib has the same curvature as that of the guide rib 212 and can be concavely rounded.

With this structure, the shield cover 21 can be tilted at a predetermined angle in the vertical direction while being inserted into the module mounting hole.

One or more camera holes 216 and one or more light passage holes 215a may be formed in the center of the cover body 211.

In detail, the camera hole 214 formed in the center of the shield cover 21 may be a hole through which the optical axis of the camera 24 for iris recognition passes. In other words, the user's iris image may be imaged by the image sensor 241 of the camera 24 through the camera hole 214.

A light passage hole 215a through which light emitted from the pair of illumination parts 23 passes may be formed on the left and right sides of the camera hole 214, respectively. According to design conditions, a predetermined length of the blocking sleeve 215 protrudes from the front surface of the cover body 211 corresponding to the edge of the light passage hole 215a, so that it is possible to block the light reflected from the cover plate 12 from entering the camera hole 214.

A camera hole 216 may be further formed at a point spaced apart from one of the pair of light passage holes 215a toward one side end part of the cover body 211, and the camera 26 for imaging the user's face may be located at the rear of the camera hole 216.

The camera holes 214 and 216 may be defined by a light guide rib 218 that protrudes backward from the rear surface of the cover body 211 and extends in the shape of a truncated cone that gradually decreases in diameter. In other words, the light guide rib 218 may be formed to be diffused toward the user from the front surface of the cameras 24 and 26.

In addition, the diffusion angles and lengths in the front and rear direction of the light guide rib positioned in front of the camera 24 for imaging the iris and the light guide rib positioned in front of the camera 26 for imaging the user's face may be designed to be different from each other.

In addition, the rear surface of the dummy groove 219 may be defined as a substrate receiving part 219a, a fastening protrusion protrudes from the substrate receiving part 219a, and the fastening protrusion may pass through the substrate 22.

In addition, a dummy groove 219 may be formed at a point spaced apart from the other one of the pair of light passage holes 215a toward the other end part of the cover body 211.

Figure 5:
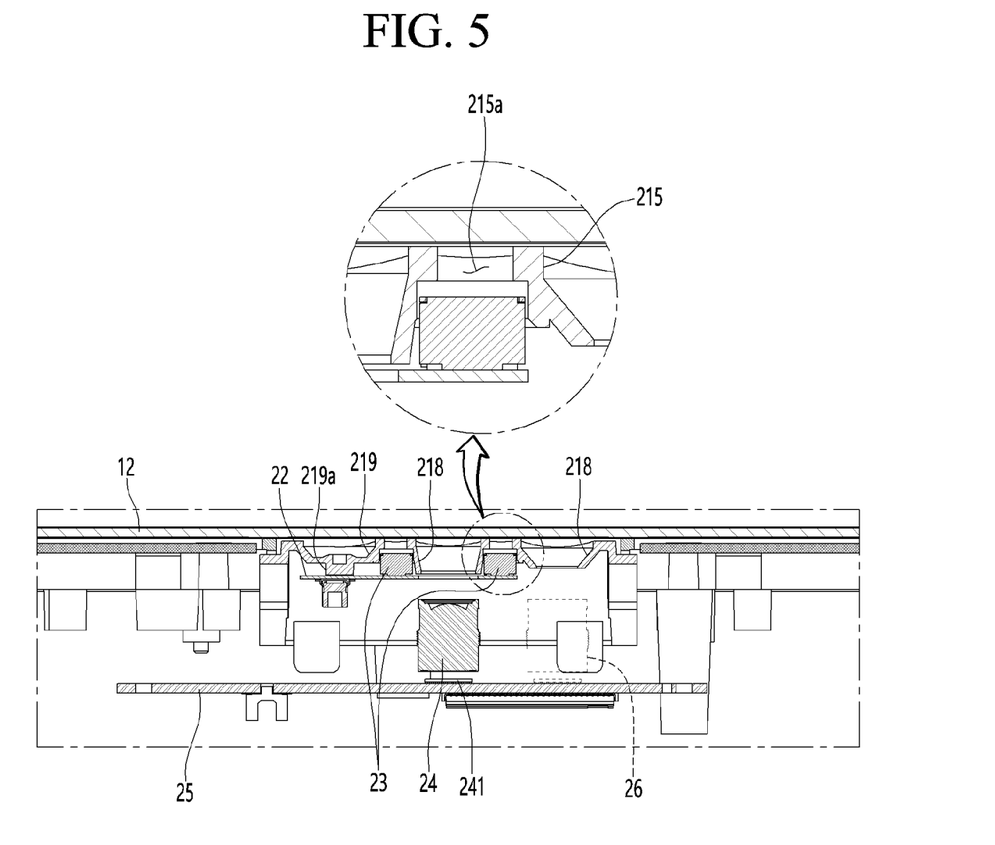
FIG. 5 is a partial cross-sectional view illustrating the iris recognition apparatus taken along line 5-5 of FIG. 1.

FIG. 5 is a partial cross-sectional view illustrating the iris recognition apparatus taken along line 5-5 of FIG. 1.

Referring to FIG. 5, the diameter of the light passage hole 215a is formed to be smaller than the cross-sectional length of the illumination part 23, thereby reducing the diffusion angle of light emitted from the illumination part 23, and thus it is possible to minimize light reflected by colliding with the cover plate 12 from entering the camera hole 214.

Alternatively, the blocking sleeve 215 extends from the edge of the light passage hole 215a to lengthen the length of the light passage hole 215a, so that it is possible to minimize the light passing through the light passage hole 215a being reflected from the cover plate 12 and entering the camera hole 214.

The diameter of the light passage hole 215a is formed to be smaller than the width of the illumination part 23, more specifically, the cross-sectional width of the light emitting device, so that it is possible to minimize the light reflected from the cover plate 12 from entering the camera hole 214.

The blocking sleeve 215 may extend with a maximum length in contact with the rear surface of the cover plate 12. In addition, when the shield cover 21 is tilted up and down, in order to minimize friction between the blocking sleeve 215 and the back surface of the cover plate 12, the end part of the blocking sleeve 215 may be designed in a smoothly rounded shape. In other words, the end part of the blocking sleeve 215 may be rounded with a curvature equal to or less than the curvature of the cover body 211 from the inner edge to the outer edge.

In addition, the blocking sleeve 215 may have a cylindrical cross-sectional structure, and as another example, may extend to be inclined or rounded in a form in which the diameter of the cross-section decreases from the front surface to the end part of the cover body 211.

For example, the blocking sleeve 215 may have a hemispherical or arcuate cross-sectional structure.

As another example, the blocking sleeve 215 may have a structure in which the blocking sleeve 215 extends in a cylindrical shape having the same diameter and then is inclined or rounded in a hemispherical shape or an arcuate shape in which the diameter decreases.

Figure 6:
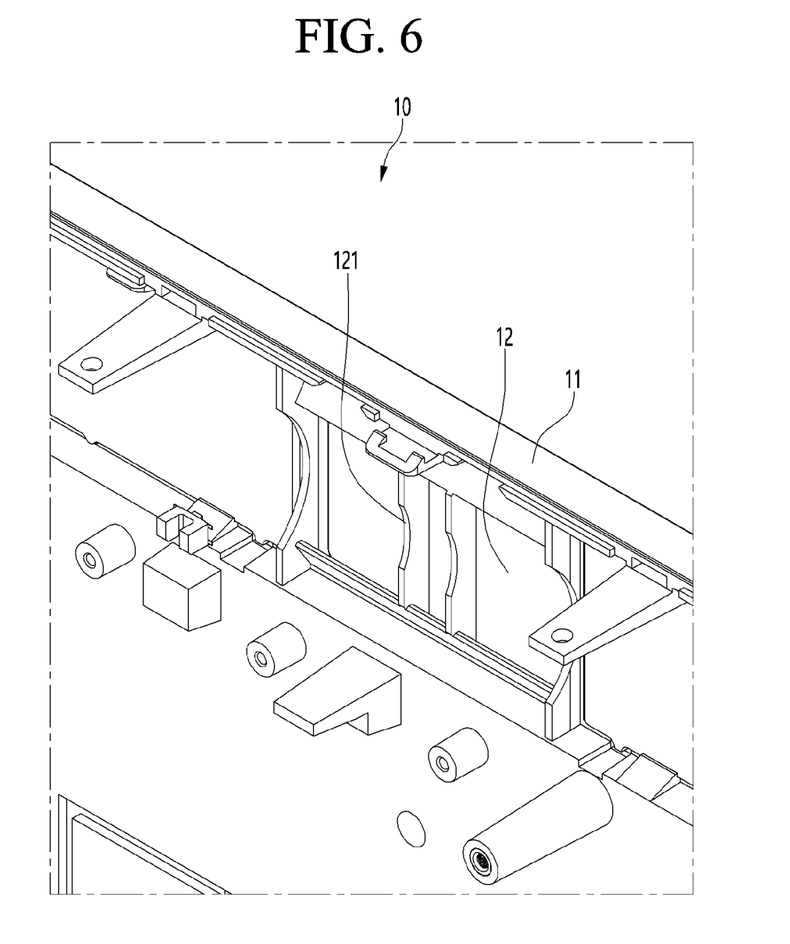
FIG. 6 is an enlarged perspective view illustrating a rear surface of a front cover constituting an iris recognition apparatus according to another embodiment of the present disclosure.
Figure 7:
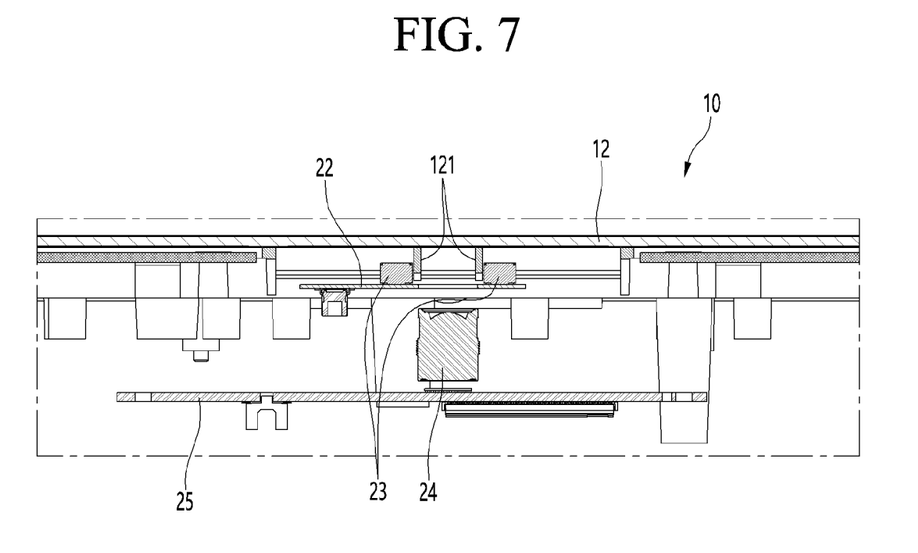
FIG. 7 is a cross-sectional view illustrating the iris recognition apparatus.

FIG. 6 is an enlarged perspective view illustrating a rear surface of a front cover constituting an iris recognition apparatus according to another embodiment of the present disclosure, and FIG. 7 is a cross-sectional view illustrating the iris recognition apparatus.

Referring to FIGS. 6 and 7, in this embodiment, instead of the shield cover 21 having the blocking sleeve 215 being provided, a pair of blocking ribs 121 may extend in the rear surface of the cover plate 12 corresponding to the iris recognition window 15.

In detail, the pair of blocking ribs 121 are adjacent to the side surfaces of the pair of illumination parts 23, respectively, and thus it is possible to fundamentally block light emitted from the illumination part 23 and reflected from the rear surface of the cover plate 12 from entering the camera 24.

Accordingly, each of the pair of blocking ribs 121 may be in close contact with the side surface of the pair of illumination parts 23 to minimize reflected light from entering the camera 24.

What is claimed is:

1. An iris recognition apparatus comprising:
   a front cover in which a module mounting hole is formed;
   a cover plate configured to be coupled to a front surface of the front cover; and
   an iris recognition module configured to be fitted into the module mounting hole from the rear of the front cover,
   wherein the iris recognition module includes:
   a shield cover fitted into the module mounting hole;
   a red-eye phenomenon generator including at least one illumination part and a substrate on which at least one illumination part is mounted, the red-eye phenomenon generator configured to be disposed on a rear of the shield cover; and
   an imaging module including a camera module for iris recognition and a substrate on which the camera module is mounted, the imaging module configured to be disposed on a rear of the red-eye phenomenon generator,
   wherein a light passage hole is formed in the shield cover at a position corresponding to a front of at least one illumination part;
   wherein the diameter of the light passage hole is smaller than a cross-sectional width of the illumination part;
   further comprising a blocking sleeve configured to extend from a front surface of the shield cover corresponding to an edge of the light passage hole.

2. The iris recognition apparatus of claim 1, wherein the blocking sleeve has a cylindrical shape with a constant diameter.

3. The iris recognition apparatus of claim 1, wherein the blocking sleeve is inclined or rounded in a shape of decreasing diameter toward the front.

4. The iris recognition apparatus of claim 1, wherein the blocking sleeve has a hemispherical or arcuate cross-sectional structure.

5. The iris recognition apparatus of claim 1, wherein the blocking sleeve has a cross-sectional shape that extends in a cylindrical shape with a constant diameter and then is inclined or rounded in a shape of decreasing diameter.

6. The iris recognition apparatus of claim 1, wherein the maximum extended length of the blocking sleeve is a length in contact with the rear surface of the cover plate.

7. The iris recognition apparatus of claim 1, wherein an end part of the blocking sleeve is rounded from an inner edge to an outer edge.

8. The iris recognition apparatus of claim 1, wherein a camera hole is formed in the center of the shield cover, wherein the camera module is located immediately behind the camera hole, and wherein the light passage holes are formed on a left side and a right side of the camera hole, respectively.

9. The iris recognition apparatus of claim 1, wherein the illumination part includes an LED element.

* * * * *